United States Patent
Kiyota et al.

(10) Patent No.: US 10,409,519 B2
(45) Date of Patent: Sep. 10, 2019

(54) INTERFACE DEVICE, AND COMPUTER SYSTEM INCLUDING INTERFACE DEVICE

(71) Applicant: Hitachi, Ltd., Tokyo (JP)

(72) Inventors: Yuusaku Kiyota, Tokyo (JP);
Tetsuhiro Gotou, Tokyo (JP);
Yoshihiro Toyohara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 165 days.

(21) Appl. No.: 15/505,746

(22) PCT Filed: Oct. 10, 2014

(86) PCT No.: PCT/JP2014/077260
§ 371 (c)(1),
(2) Date: Feb. 22, 2017

(87) PCT Pub. No.: WO2016/056140
PCT Pub. Date: Apr. 14, 2016

(65) Prior Publication Data
US 2017/0277470 A1   Sep. 28, 2017

(51) Int. Cl.
*G06F 12/08* (2016.01)
*G06F 3/06* (2006.01)
*G06F 13/10* (2006.01)
*G06F 9/50* (2006.01)

(52) U.S. Cl.
CPC ............ *G06F 3/0644* (2013.01); *G06F 3/061* (2013.01); *G06F 3/0604* (2013.01); *G06F 3/0631* (2013.01); *G06F 3/0665* (2013.01); *G06F 3/0683* (2013.01); *G06F 3/0689* (2013.01); *G06F 9/5016* (2013.01); *G06F 13/10* (2013.01)

(58) Field of Classification Search
CPC combination set(s) only.
See application file for complete search history.

(56) References Cited

U.S. PATENT DOCUMENTS

| | | | |
|---|---|---|---|
| 2005/0240924 A1 | 10/2005 | Jones et al. | |
| 2007/0011495 A1* | 1/2007 | Armstrong | G06F 11/2033 714/39 |
| 2007/0276897 A1 | 11/2007 | Tameshige et al. | |

(Continued)

FOREIGN PATENT DOCUMENTS

| | | |
|---|---|---|
| JP | 2007-316724 A | 12/2007 |
| JP | 2008-152594 A | 7/2008 |

(Continued)

OTHER PUBLICATIONS

International Search Report and Written Opinion of PCT/JP2014/077260 dated Jan. 6, 2015.

*Primary Examiner* — Yong J Choe
(74) *Attorney, Agent, or Firm* — Mattingly & Malur, PC

(57) ABSTRACT

A computer system comprises: a host computer including a host memory and a plurality of host processors; a storage apparatus; and an interface device coupled to the host computer and the storage apparatus, the interface device including a plurality of communication processors, wherein the host computer is configured to create a first logical partition, which is a destination of dedicated allocation of a first host memory area which is a partial area of the host memory, at least one of the plurality of host processors, and at least one of the plurality of communication processors.

9 Claims, 12 Drawing Sheets

(56) References Cited

U.S. PATENT DOCUMENTS

| | | |
|---|---|---|
| 2008/0148015 A1 | 6/2008 | Takamoto et al. |
| 2009/0240910 A1 | 9/2009 | Inomata et al. |
| 2014/0136740 A1 | 5/2014 | Monji et al. |

FOREIGN PATENT DOCUMENTS

| | | |
|---|---|---|
| JP | 2009-230381 A | 10/2009 |
| JP | 2012-185660 A | 9/2012 |
| WO | 2013/001578 A1 | 1/2013 |

* cited by examiner

INTERFACE DEVICE, AND COMPUTER SYSTEM INCLUDING INTERFACE DEVICE

BACKGROUND

This invention relates to an interface device configured to process input/output (I/O) commands, and a computer system including the interface device and having a logical partitioning function.

A protocol chip installed in a Host Bus Adapter (HBA) is commonly implemented with a communication processor configured to offload connection protocols, however the load applied to the HBA is steadily increasing as connection speed increases and virtual technology become more and more popular. Since the processing capacity of the communication processor in the protocol chip suffers the performance bottleneck, a method to control one fiber channel port by using multiple communication processors (e.g., see International Publication WO 2013/001578). The method according to International Publication WO 2013/001578, which includes multiple communication processors at an HBA, controls the frames received via a fiber channel in a parallel manner by multiple protocol control circuits.

However, the method according to International Publication WO 2013/001578 in which a driver for controlling the multiple communication processors operating at a host has a problem in that as the driver disperses the loads of I/O commands among the multiple communication processors arranged at the HBA, the loads are dispersed unevenly (first problem). Because of such uneven dispersion, even with the increased number of the communication processors, the improvement of the transaction performance remains obstructed.

Also, even when the loads of I/O commands are distributed evenly among the multiple communication processors, the I/O characteristic of the I/O commands to a storage apparatus, which is sequential, declines the transaction performance (second problem). Since accesses to the storage are controlled in units of blocks, performances vary depending on the I/O characteristics. What is referred to as I/O characteristics includes whether the access pattern to the storage apparatus is sequential or random.

In a sequential access a block is either read or written continuously, where as in a random access a block is read and/or written in a random manner. Even with the same amount of data being transferred, between a sequential access and a random access the number of requests to the storage to either read or write differs: for example, when the size of a block is 4 [KB] in a total of 40 [KB] of data, the number of read/write request to a disk is 1 with sequential access to the storage apparatus, whereas with random at 4 [KB], the number is 10 times.

It is a common practice to implement an algorithm to streamline the sequential accesses when a sequential read commands and write commands are sent to the storage apparatus, and thus falling apart the sequential quality causes the response performance of the storage apparatus to decline.

Also, there is another problem that when I/O commands having a smaller block size and I/O commands having a larger block size are mixed in an access to the storage apparatus, the transaction performance declines due to the I/O commands having a smaller block size (third problem). An example will be described using a case where a tape apparatus and a disk apparatus are connected via a fiber channel connected with an identical port of the HBA.

The storage controls data transfers in units called blocks. The tape apparatus controls the data transfers using larger blocks (e.g., 8 time to 64 times) with respect to the disk apparatus. Accordingly, when a request to process an I/O command to the tape apparatus and a request to process an I/O command to the disk apparatus are sent to the same communication processor, processing time for the I/O commands of the tape apparatus, which uses larger block size, increases. This will generate a wait time for processing the I/O commands of the disk apparatus, which uses smaller block size, while the both of the apparatuses use the same fiber channel, which subsequently will cause the performance thereof to deteriorate.

With respect to the third problem, a method has been available where a system design to separate the HBA with which the disk apparatus is connected from the HBA with which the tape apparatus is connected is used to ensure a communication band for the tape apparatus in order to prevent the performance bottleneck for the entire system. However, the necessity to introduce the HBA exclusively for the tape apparatus increases the introduction cost.

The third problem is not limited for the circumstance where the tape apparatus and the disk apparatus, each as the device with which connections are made, are mixed with one another, but also depends on the characteristics of the database stored at the storage apparatus. An example will be provided where a business system (OLTP) and an information system (DWH) are both arranged within a storage apparatus and connected with the same port.

OLTP refers to an online transaction processing and is a mechanism where a host and a user terminal connected with one another via a network perform a series of processes, and in general is used for data entry and retrieval transaction processing. The block size used when processing one time I/O command is small (a few kilo bytes), while high speed response performance is expected.

Now, DWH (data warehouse) is a system for analyzing vast amounts of business data, as referred to as big data in recent years, for relevancy of and among items. In DWH, I/O commands use larger block size (several tens of kilo bytes, or more) and throughput performance, rather than response performance, is expected.

As such, since OLTP uses I/O commands of smaller block size while DWH is controlled using I/O commands of larger block size, problems that are similar to the problems that arise when a disk apparatus and a tape apparatus are connected with the same port of the HBA also arise. In other words, when I/O command process for OLTP and those for DWH are requested to the same communication processor, increasing the processing time for DWH using I/O command of the larger block size causes a wait period for OLTP using I/O command of the smaller block size to generate. Accordingly, the response performance expected of OLTP declines.

When viewed from a different perspective, the technology described in International Publication WO 2013/001578 doesn't disclose how the communication processors are to be allocated to the logical partitions (hereinafter referred to as "LPARs") created on the host.

SUMMARY

In order to solve the above stated problems, the present invention aims to improve the processing performance with respect to the storage apparatus.

An aspect of the invention disclosed in this application is a computer system comprises: a host computer including a host memory and a plurality of host processors; a storage apparatus; and an interface device coupled to the host computer and the storage apparatus, the interface device including a plurality of communication processors, wherein the host computer is configured to create a first logical partition, which is a destination of dedicated allocation of a first host memory area which is a partial area of the host memory, at least one of the plurality of host processors, and at least one of the plurality of communication processors.

According to a representative embodiment of the present invention, it becomes possible to improve the processing performance with respect to the storage apparatus. Other objects, configurations, and effects than those described above are clarified by the following description of an embodiment.

DETAILED DESCRIPTION OF THE EMBODIMENT

Embodiments of this invention are now described. In the following examples, the description is based on the use of a fiber channel HBA, but the coupling between the host and the storage apparatus may be a coupling other than a fiber channel. For example, InfiniBand, Ethernet, and peripheral component interconnect (PCI)-Express may be employed as the coupling. HBA is also merely an example. The technology described in the embodiments may be applied in any interface device that is used when coupling a host to a storage apparatus. From a perspective of parallel operation, it is desired, but not essential, that the communication processors described in the following description do not share hardware circuits. For example, each of a plurality of cores provided in the technology referred to as Hyper-Threading Technology by Intel Corporation may be regarded as a communication processor. It is also to be understood that the cores may correspond to the communication processors. This is also the case for a host CPU 401 and storage processors.

First Embodiment

Figure 1:
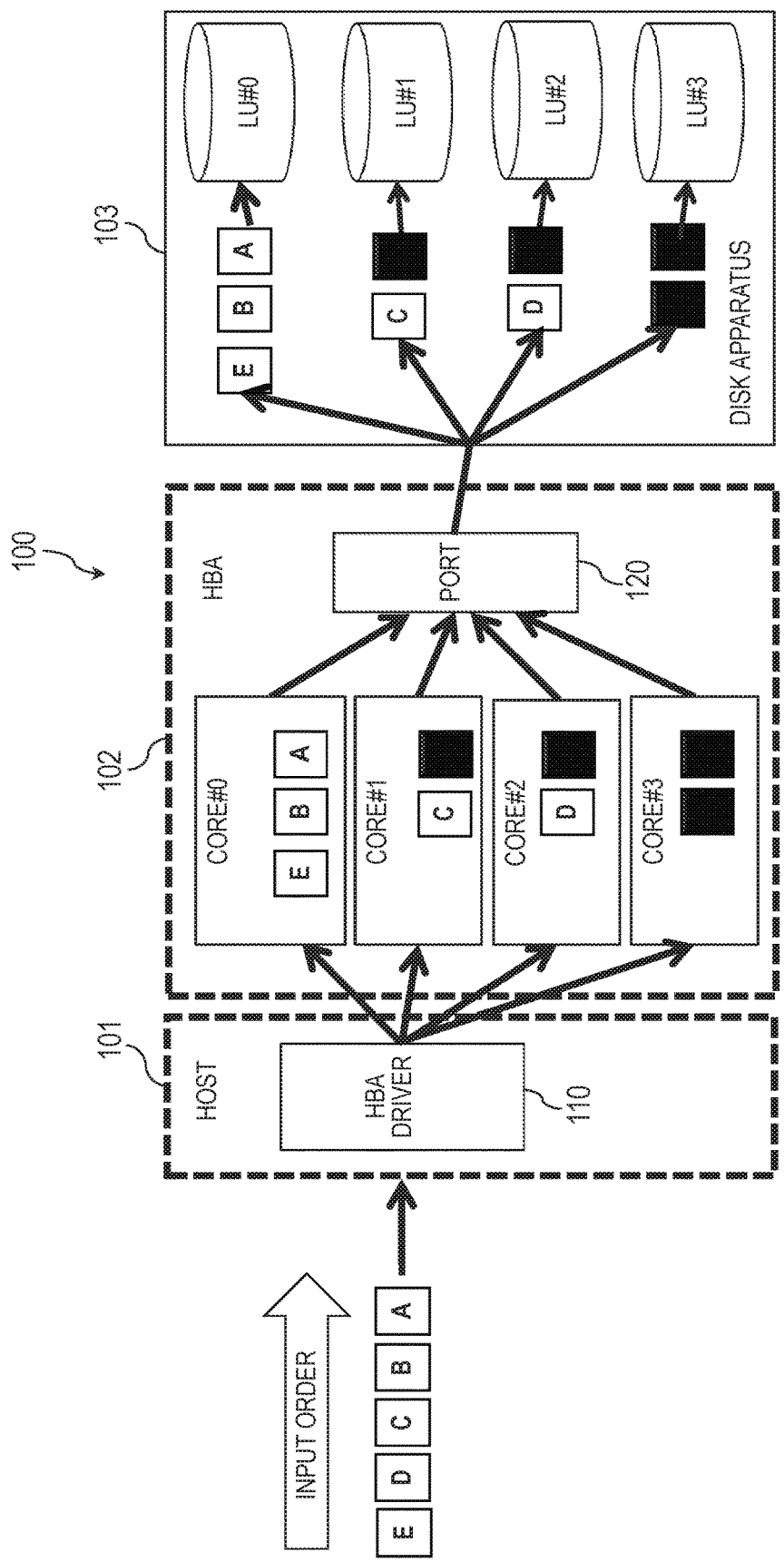
FIG. 1 is an explanatory diagram illustrating an input output control example 1 by a host according to the present embodiment.

FIG. 1 is an explanatory diagram illustrating an input output control example 1 by a host according to the present embodiment. The input output control example 1 is configured to improve the transaction performance via a load balancing method that distributes the load of I/O commands evenly among a plurality of communication processors arranged at an HBA.

In FIG. 1, a communication system 100 includes a host 101, an HBA 102, and a disk apparatus 103. The host 101 includes an HBA driver 110 configured to control the HBA 102. The HBA 102 includes a plurality of cores, #0 through #3, and a port 120, and transfers I/O commands to the disk apparatus 103. While the present embodiment includes, as an example, 4 units of cores, however, the present invention is not limited thereto; it requires at least 2 units of cores included therein. I/O commands A through E are to be inputted to the host 101 in an alphabetical order.

The disk apparatus 103 includes a plurality of logical units, LU#0 through LU#3. While the present embodiments include, as an example, 4 logical units, however, the present invention is not limited thereto; it requires at least 2 logical units. Also note that the number of the logical units does not need to match the number of the cores.

The host 101 refers to the status of the load on the plurality of cores #0 through #3, and selects the core to which the I/O commands A through E will be allocated. Note that the black rectangles shown in the cores #0 through #3 indicate the I/O commands that were inputted prior to the I/O commands A through E. The HBA driver 110 allocates the I/O command A to the core #0 which has the least number of preceding I/O commands. Next, the HBA driver 110 allocates the I/O command B to one of the cores #0 through #2 having the least number of preceding I/O commands. Note that when there are multiple destination candidates for allocation, the core having the smallest reference number shall be selected.

Next, the HBA driver 110 allocates the I/O command C to the core #1 that has the least number of preceding I/O commands, and then allocates the I/O command D to the core #1 that has the least number of preceding I/O commands. As such, since the larger the number of I/O commands that are currently being executed, the greater the load applied to the core becomes, the HBA driver selects the core having the least number of I/O commands currently being executed thereat, and outputs the I/O command thereto. By uniformly dispersing the I/O command load among the communication processors arranged at the HBA, it becomes possible to improve the transaction performance.

<Input Output Control Example 2>

Figure 2:
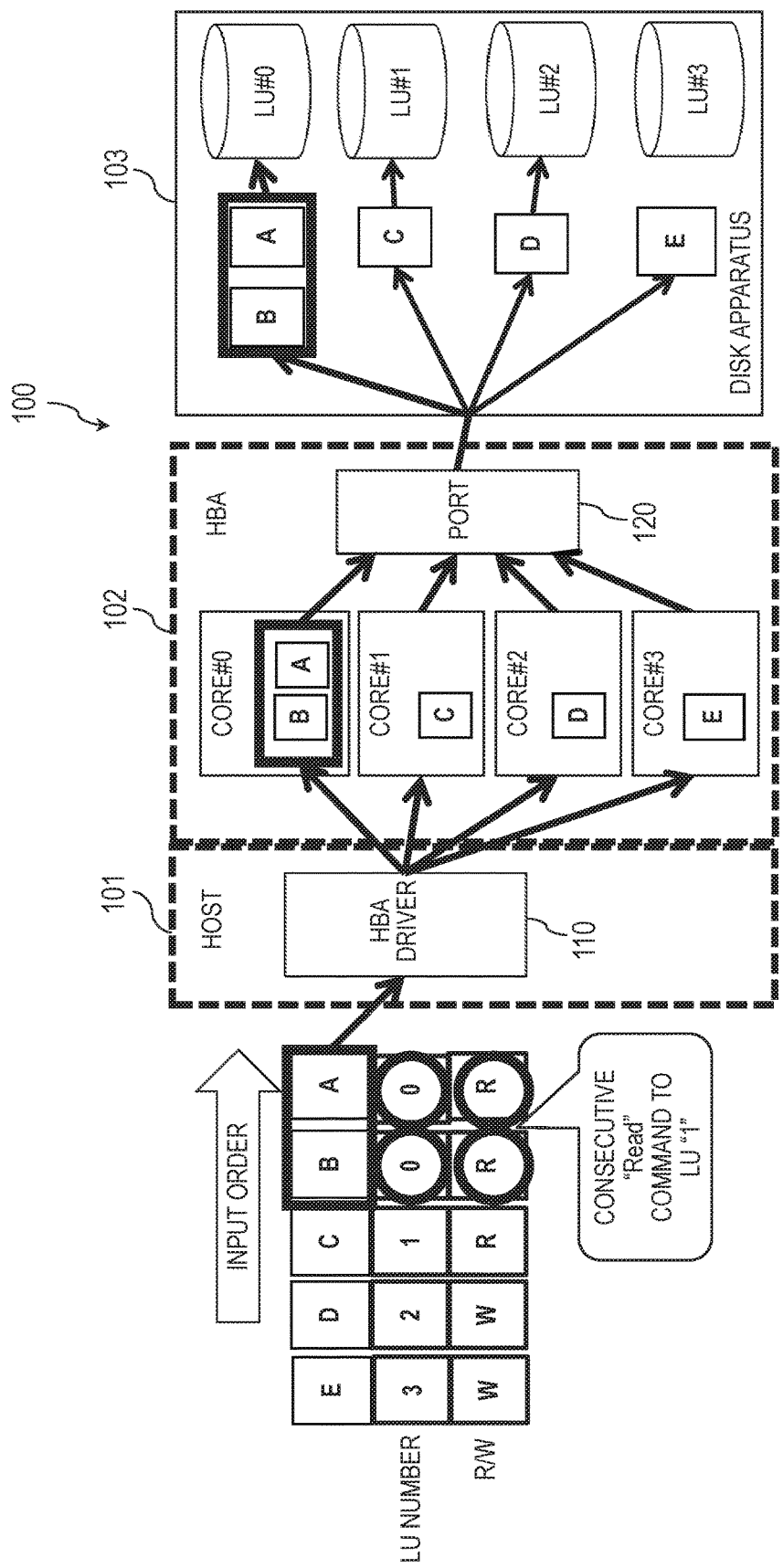
FIG. 2 is an exemplary diagram illustrating an input output control example 2 by the host according to the present embodiment.

FIG. 2 is an exemplary diagram illustrating an input output control example 2 by the host according to the present embodiment. The input output control example 2 is configured to improve the transaction performance when the I/O characteristics of the I/O command to the storage apparatus is sequential.

Note that according to FIG. 2 the I/O commands A through E are inputted in an alphabetical order to the host 101. Note that the same reference numerals as those for the commands are used for the data within the commands. For example, data at the command A will be data A. Data is associated with an LU number and an R/W. Here, a combination of an LU number and an R/W comprise one I/O command.

The LU number includes identification information configured to uniquely specify the logical unit within the disk apparatus 103, which includes an access destination of the data associated with the LU number. For example, the I/O command whose LU number includes "0" will be outputted to the logical unit LU #0 of the disk apparatus 103. The R/W includes an access type indicating whether the I/O command includes a read command or a write command.

The HBA driver 110 fetches the I/O commands in the order of I/O command A to I/O command E. The HBA driver 110 judges the continuity of the I/O commands that are continuous and the identity of access types. As for the continuous I/O commands (A and B), each command includes an access type "R" (read). When the HBA driver 110 determines the addresses to which an access is made are continuous, the continuous I/O commands (A and B) will be processed by the same core. According to the present example, the HBA driver 110 passes the continuous I/O commands (A and B) to the core #0, and the core #0 transfers, via the port 120, the continuous I/O commands (A and B) to the logical unit LU #0 in the order of I/O command A and I/O command B.

Further, the HBA driver 110 makes the same judgment with respect to the continuous I/O commands (B and C), (C and D), and (D and F). The HBA driver 110 allocates the I/O command C to the core #1, the I/O command D to the core #2, and the I/O command E to the core #3 according to the load balancing method illustrated in FIG. 1.

Then, the core #1 transfers the I/O command C to the logical unit LU #1; the core #2 transfers the I/O command D to the logical unit LU #2; and the core #3 transfers the I/O command E to the logical unit LU #3. This makes it possible to operate in a parallel manner with no imbalance of the I/O commands applied among the plurality of cores, and to improve the transaction performance of the port 120.

<Input Output Control Example 3>

Figure 3:
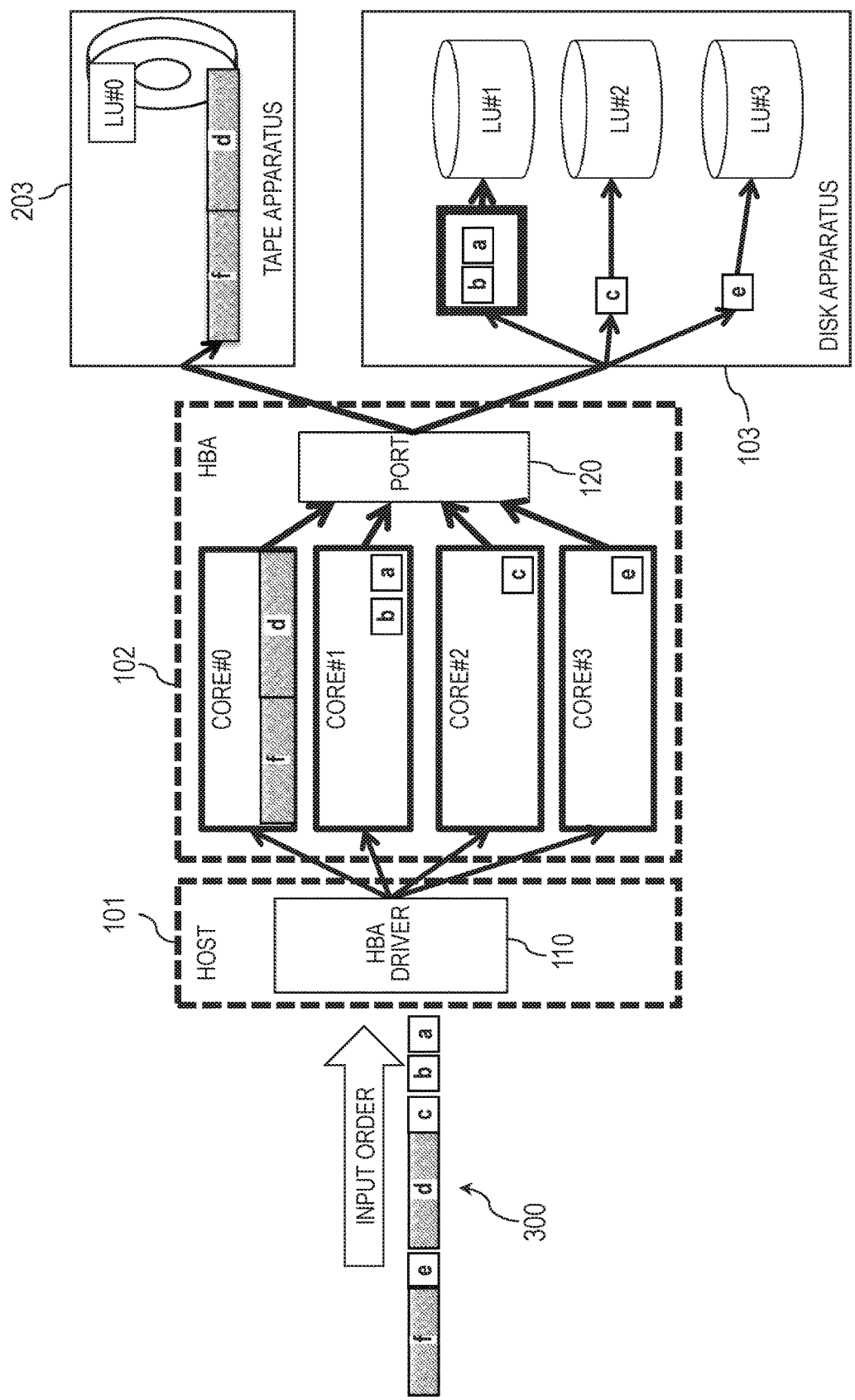
FIG. 3 is an explanatory diagram illustrating an input output control example 3 by the host according to present embodiment.

FIG. 3 is an explanatory diagram illustrating an input output control example 3 by the host 101 according to the present embodiment. The input output control example 3 is configured to improve the transaction performance of an I/O command having a smaller block size when an I/O command having a smaller block size and an I/O command having a larger block size are mixed concerning an access to the storage apparatus. The input output control example 3, as an example of the storage apparatus, will be described with an example in which a tape apparatus 303 and the disk apparatus 103 are connected with one another via a fiber channel switch (not illustrated) which is connected with the port 120 of the HBA 102. Note that the tape apparatus 303 may be replaced with an information system (DWH), while the disk apparatus 103 may be replaced with a business system (OLTP).

According to FIG. 3, the core #0 is the communication processor that is occupied to the tape apparatus 303, while the cores #1 through #3 are the communication processors that are occupied to the disk apparatus 103. Of a sequence of I/O commands 300, the I/O commands a through c, and e each have a smaller block size, while the I/O commands d and f each have a larger block size.

The HBA driver 110 of the host 101 selects the cores which will be the transfer destinations for the I/O commands a through f which are inputted thereto in a sequential manner. Since the tape apparatus 203 controls the data transfer using larger (i.e., 8 times to 64 times) block size with respect to the disk apparatus 103, the HBA driver 110 transfers the I/O commands d and f in said order to the core #0.

As such, it becomes possible, when the I/O commands having a larger block size and the I/O commands having a smaller block size are mixed together, to improve the processing performance of the I/O commands having the smaller block size which is influenced negatively due to the processing of the I/O commands having the larger block size. Accordingly, the HBA 102, which required to be divided into multiple pieces in accordance with the type of connected storage or data base characteristics, can be grouped together in a single piece, which enables the introduction cost of the system to be reduced.

Also, the HBA driver 110 distributes the I/O commands a through c, and e to the core #1 through core #3. At this point, the cores to which the I/O commands are distributed are selected in accordance with the LU number designated in the I/O commands a through c, and e. Also, as illustrated with the input output control example 2 in FIG. 2, the HBA driver 110 selects the same cores as the distribution destination in accordance with the continuity of the continuous I/O commands and the identity of access type.

For example, when the continuous I/O commands (a and b) both include the continuity in the address that they both access, and the access type is "R" (read), the continuous I/O commands (a and b) will be transferred to the core #1 which corresponds to the logical unit LU #1. This makes it possible to operate in a parallel manner with no imbalance of the I/O commands applied among the plurality of cores and to improve the transaction performance of the port 120.

<Hardware Configuration Example of Communication System 100>

Figure 4:
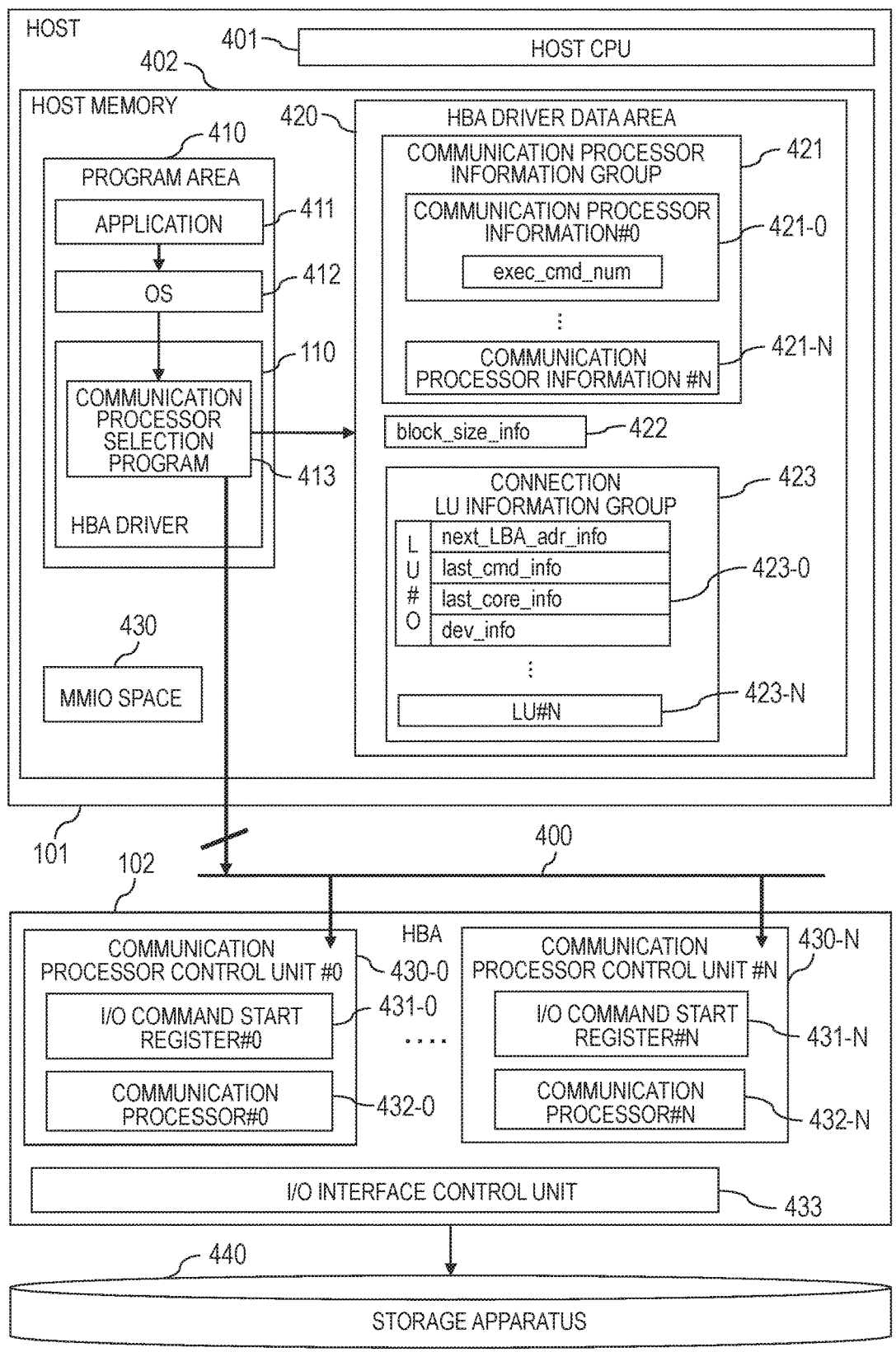
FIG. 4 is a block diagram illustrating an example of a hardware configuration of the communication system.

FIG. 4 is a block diagram illustrating an example of a hardware configuration of the communication system 100. The communication system 100 includes the host 101, the HBA 102, and a storage apparatus 440. The host 101 and the HBA 102 are connected with one another via a PCI bus, and the HBA 102 is further connected with the storage apparatus 440 via an I/O interface control unit 433 (corresponding to the port 120). The storage apparatus 440 includes one or more storage areas. The storage area refers to an area where data will be read or written in accordance with the I/O command.

For example, when the storage apparatus 440 is the disk apparatus 103, it will include one or more logical disks as illustrated in FIG. 1. Also, the storage apparatus 440 may include one or more tape apparatuses 303. Also, a storage apparatus 340 may include, as illustrated in FIG. 2, a configuration where the disk apparatus 103 and the tape apparatus 303 are included. Also, the storage apparatus 340 may include the storage apparatus 340 that is arranged within an information system (DHW) or a business system (OLTP). Note that the host 101 regards the storage apparatus 340, which will be the access destination, as a logical unit whether the type of the storage apparatus 340 is a physical disk apparatus 103 or a tape apparatus 303.

The host 101 includes a host Central Processing Unit (CPU) 401 and a host memory 402. The host CPU 401 controls the host 101. The host memory 402 includes a work area for the host CPU 401. Also, the host memory 402 includes a non-temporary storage medium configured to store various types of programs and data. The host memory may include a Read Only Memory (ROM), a Random Access Memory (RAM), an Hard Disk Drive (HDD), or a flash, for example.

The host memory includes a program area 410, an HBA driver data area 420, and an MMIO space 430. The program area 410 stores an application 411, an Operating System (OS) 412, and the HBA driver 110, which are executed by the host CPU 301. Also, the HBA driver 110 includes a communication processor selection program 413.

The HBA driver area 420 stores a communication processor information group 421, a connection LU information group 423, and block size information (block_size_info) 422. The communication processor information group 421 includes communication processor information 421-0 through 421-N per communication processor. The communication processor information refers to the information configured to manage the corresponding communication processor out of the communication processor group at the HBA 102. To be more specific, the communication processor information 421-0 through 421-N include the number of commands currently being executed (exec_cmd_num). The number of commands currently being executed (exec_cmd_num) includes the number of I/O commands that are currently being processed. The greater the number of commands currently being executed (exec_cmd_num) is, the greater the load is being applied to the communication processor.

The connection LU information group 423 includes the connection LU information 423-0 through 423-N per logical unit. The connection LU information 423-0 through 423-N refers to the information configured to control the logical unit. To be more specific, the connection LU information 423-0 through 423-N may include last command information (last_cmd_info), continuity determination information (next_LBA_adr_info), occupancy allocation information (dev_info), and last core information (last_core_info), for example.

The last command information (last_core_info) includes the information configured to indicate whether the access type of the I/O command executed with respect to the logical unit included writing (W) or reading (R).

The continuity determination information (next_LBA_adr_info) includes the information used to determine whether or not the access pass to the logical unit is sequential. To be more specific, the continuity determination information (next_LBA_adr_info) may include the sum of the access address for the logical unit and the block size of the I/O command gaining access thereto, for example.

The occupancy allocation information (dev_info) includes management information configured to exclusively allocate the control of the I/O command to a transfer destination logical unit to a specified communication processor. To be more specific, the occupancy allocation information (dev_info) may include the identification information configured to uniquely specify the specified communication processor that is exclusively allocated, for example.

The occupancy allocation information (dev_info) includes a parameter that an operator sets to an HBA driver data area 320 via the application 411 when the operator introduces the communication system 100.

The last core information (last_core_info) includes the information for managing the communication processor that last activated the I/O command addressed to the logical unit. To be more specific, the core information (last_core_info) may include the identification information configured to uniquely specify the communication processor that last activated the last I/O command addressed to the LU, for example.

The block size information (block_size_info) 422 includes the information configured to have the communication processor, which controls the I/O command, occupied in accordance with the block size. To be more specific, the block size information (block_size_info) 422 may include the block size of the I/O command which is correlated to the communication processor, for example.

The MMIO space 430, which stands for Memory Mapped Input Output space, includes an address space where the HBA driver 110 gains access to a register within the I/O device such as the HBA 102.

The HBA 102 includes a plurality of communication processor control units 430-0 through 430-N. The communication processor control units 430-0 through 430-N access corresponding logical units via the I/O interface control unit 433. The communication processor control units 430-0 through 430-N include I/O command start registers 431-1 through 431-N, and communication processors 432-0 through 432-N. The I/O command start registers 431-1 through 431-N retain the I/O commands from the HBA driver 110. Next, an internal configuration of the HBA 102 will be described below.

Figure 5:
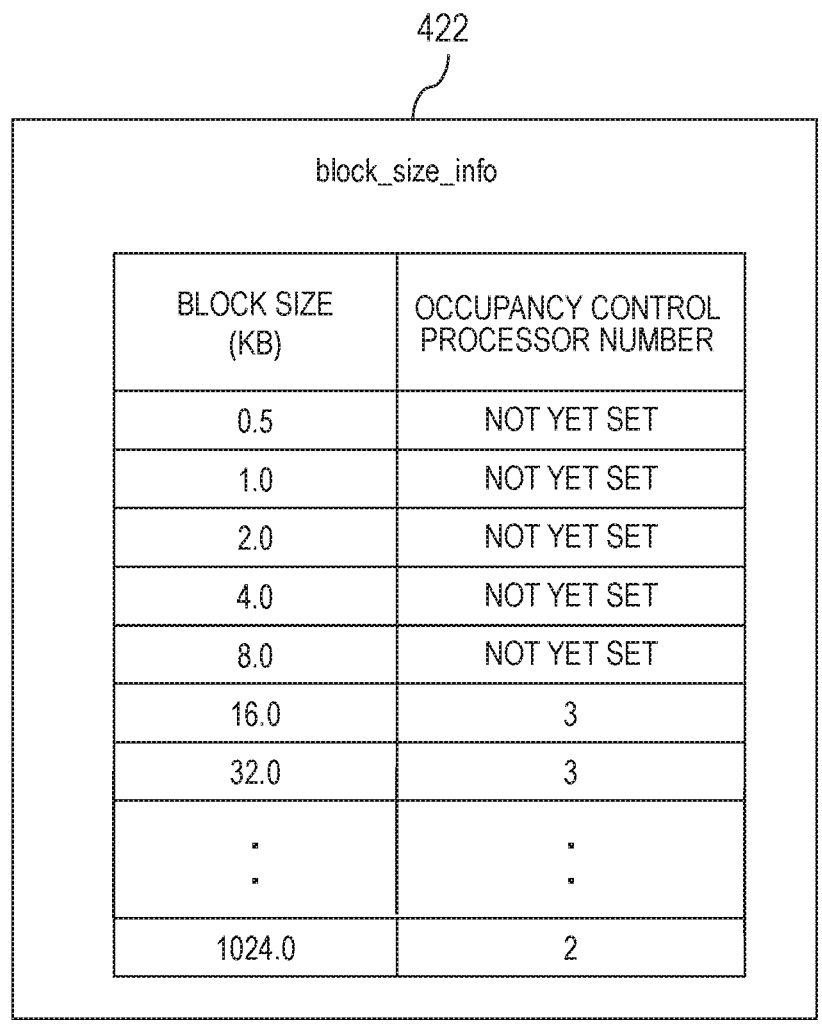
FIG. 5 is an explanatory diagram illustrating an example of a stored content of the block size information (block_size_info).

FIG. 5 is an explanatory diagram illustrating an example of a stored content of the block size information (block_size_info) 422. The block size information (block_size_info) 422 includes the information which correlates the block size with an occupancy control processor number. The block size refers to the block size of the communication processor. The occupancy control processor number refers to the number of the communication processor that occupancy controls I/O commands. The communication processor that occupancy controls I/O commands refers to the communication processor which will be selected when the I/O command having a corresponding "BLOCK SIZE" is received. For example, when the block size of an I/O command is 16 [KB], the communication processor #3 is the communication processor that will be occupancy controlled. Accordingly, the destination to which this I/O command will be sent is the communication processor #3. Also, "NOT YET SET" indicates the communication processor that will be occupancy controlled.

Figure 6:
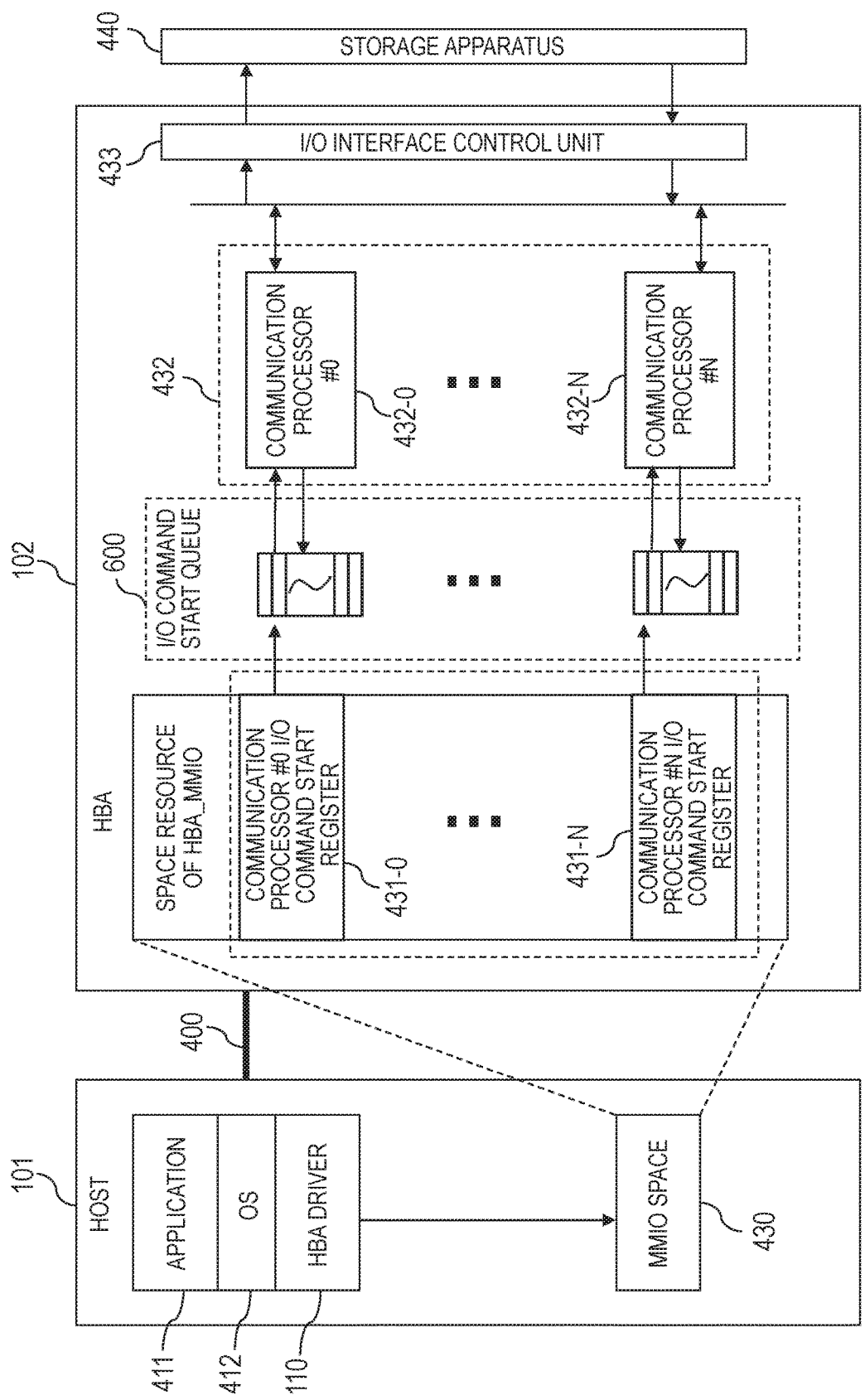
FIG. 6 is an explanatory diagram illustrating the detailed configuration of the HBA.

FIG. 6 is an explanatory diagram illustrating the detailed configuration of the HBA 102. The I/O command start registers 431-0 through 431-N are mapped to the MMIO space 430. This enables the HBA driver 110 to access the I/O command start registers 431-0 through 431-N and to give an I/O command execution instruction to the communication processor.

The HBA 102 stacks the I/O commands instructed by the HBA driver 110 at an I/O command start queue 600 per communication processor, and gives a notification with respect to the communication processor group 432 to start the I/O command. Then, the communication processor group 432 sends the I/O command to the storage apparatus 440 via the I/O interface control unit 433. A coupling 400 between the host 101 and the HBA 102 may be, for example, a coupling based on PCI-Express, or another coupling. The host 101 may include the HBA 102.

<Functional Configuration Example of Host 101>

Figure 7:
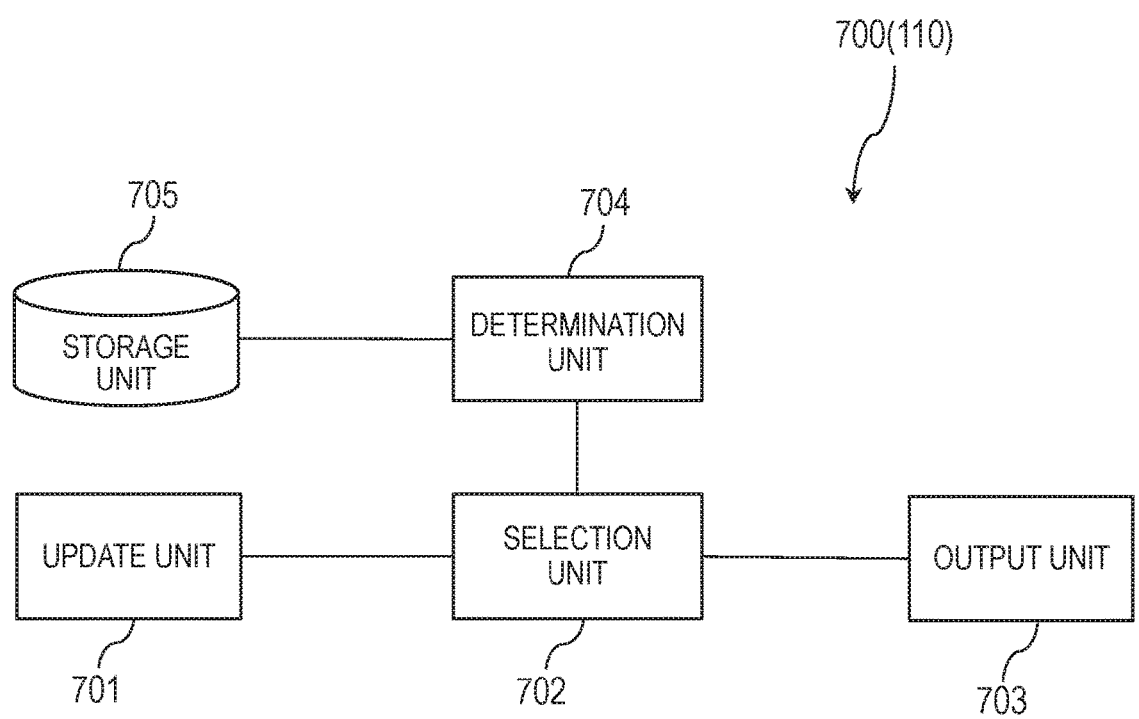
FIG. 7 is a block diagram illustrating an example of a functional configuration of the host.

FIG. 7 is a block diagram illustrating an example of a functional configuration of the host 101. A control apparatus 700, which corresponds to the host 101, includes a control apparatus configured to control a plurality of processors corresponding to each of a plurality of storage areas arranged at the interface that is configured to access the storage areas. These storage areas refer to storage areas within the storage apparatus 440, which corresponds, for example, to the logical unit of the disk apparatus 103 or the tape apparatus 303. These processors include, for example, the communication processor group 432; and the interface that is configured to access the storage areas refer, for example, to the HBA 102 having the communication processor group 432.

The control apparatus 700 includes an update unit 701, a selection unit 702, an output unit 703, a determination unit 704, and a storage unit 705. The features of the update unit 701 to the determination unit 704 are realized, to be more specific, by having the host CPU 401 execute the HBA driver 110 illustrated in FIG. 4, for example. Also, the features of the storage unit 705 are realized by the host memory 402.

The update unit 701, when a sequence of commands which is outputted to each of the storage areas is inputted thereto, updates the load of the command that each of the processors is currently executing with respect to the storage area that corresponds to the processor. To be more specific, the update unit 701 may update the number of commands (exec cmd_num) currently being executed that are stored at each piece of the communication processor information 321-0 through 321-N of the communication processor information group 421, for example. That is, when issuing an I/O command to the communication processor, the update unit 701 increments by one the number of commands (exec_cmd_num) currently being executed and when receiving an end notification from the communication processor, the update unit 701 decrements by one the same.

The selection unit 702, with respect to any one of the commands in the sequence of commands, selects a processor out of the processors, to which any one of the commands will be allocated, based on the load of the command currently being executed for each processor which was updated by the update unit 701. To be more specific, the selection unit 702 may select the communication processor that has the smallest number of the commands (exec_cmd_num) that are currently being executed as the allocation destination, for example.

The output unit 703 outputs any one of commands to the processor selected by the selection unit 702. To be more specific, the output unit 703 may, by the I/O interface control unit, send the I/O command to the logical unit that corresponds to the communication processor of the allocation destination, for example.

The determination unit 704 determines with respect to the first command and the second command, which is immediately after the first command, of the sequence of commands as to whether the address accessing any one of the storage areas includes continuity or whether or not the access type is the same. To be more specific, the determination unit 704 may make a determination concerning the continuity of the continuous I/O commands and the identity of access type, for example.

To be more specific, the determination unit 704 may make a comparison between the continuity determination information (next_LBA_adr info) of the first command which is the preceding command of continuous I/O commands and the address to which the second command, which follows the preceding command of the continuous I/O commands, accesses, for example. The continuity determination information (next_LBA_adr_info) refers to the sum of the address for accessing the logical unit and the block size of the I/O commands that gains the access. When the result of the comparison matches, the determination unit 704 determines the first command and the second command include the continuity between one another.

Also, the determination unit 704 refers to the last command information (last_core_info) so as to identify whether the access type of the first command includes writing (W) or reading (R), and whether it matches the access type of the second command. When it is determined it matches, the determination unit 704 determines that the first command and the second command include the same access type.

In this case, the selection unit 702 will not select an allocation destination for the second command based on the number of the commands (exec_cmd_num) currently being executed. Then, when it is determined by the determination unit 704 that the address being accessed includes continuity and the access types are the same, the selection unit 702 selects the processor that corresponds to the storage area to which the first command gained access out of the plurality of processors. For example, when the access destination of the first command includes the logical unit #0, the access destination of the second command becomes the logical unit #0. Note, however, that when the address includes no continuity, or when the access types are not the same, the selection unit 702 will select the allocation destination of the second command based on the number of the commands (exec_cmd_num) currently being executed.

The storage unit 705 stores therein first association information which correlates the identification information of the processor that is specified out of the processors with the identification information of the storage area specified out of the storage areas including the access destination of the specified processor. The first association information refers to the occupancy allocation information (dev_info) within the connection LU information 423-0 through 423-N. That is, the identification information of the specified processor includes the number for the logical unit that is specified by the connection LU information 423-0 through 423-N, while the identification information of the specified storage area refers to the number for the communication processor that is stored at the occupancy allocation information (dev_info).

When using the first association information, the determination unit 704 refers to the first association information to determine whether or not the identification of the storage area including the access destination of the second command retained at the second command matches the identification information of the specified storage area. Then, when it is determined by the determination unit 704 that the identification information of the storage area including the access destination of the second command matches the identification information of the specified storage area, the selection unit 702 selects the specified processor.

For example, when the access destination of the second command which follows the preceding command of the continuous I/O commands includes the logical unit #0, and when the specified storage area includes the logical unit #0, the selection unit 702 selects as the allocation destination of the second command the communication processor which is designated by the number for the communication processor stored at the occupancy allocation information (dev_info) of the connection LU information 423-0 of the logical unit #0.

Also, the storage unit 705 stores therein second association information which correlates the identification information of the processor that is specified out of the processors with the size of the command outputted to the access destination by the specified processor. The second association information refers to the block size information (block_size_info) 422.

When using the second association information, the determination unit 704 refers to the second association information to determine whether or not the size of the second command matches the size of the command outputted by the specified processor to the access destination. Then, when it is determined by the determination unit 704 that the size of the second command matches the size of the command outputted by the specified processor to the access destination, the selection unit 702 selects the specified processor.

For example, when the block size of the second command which follows the preceding command of the continuous I/O commands includes 16.0 [KB], and when the number for the communication processor which corresponds, according to the block size information (block_size_info) 422, to the block size of 16.0 [KB] includes "3," the selection unit 702 selects as the allocation destination of the second command the communication processor #3.

<Sequence for Communication System 100>

Figure 8:
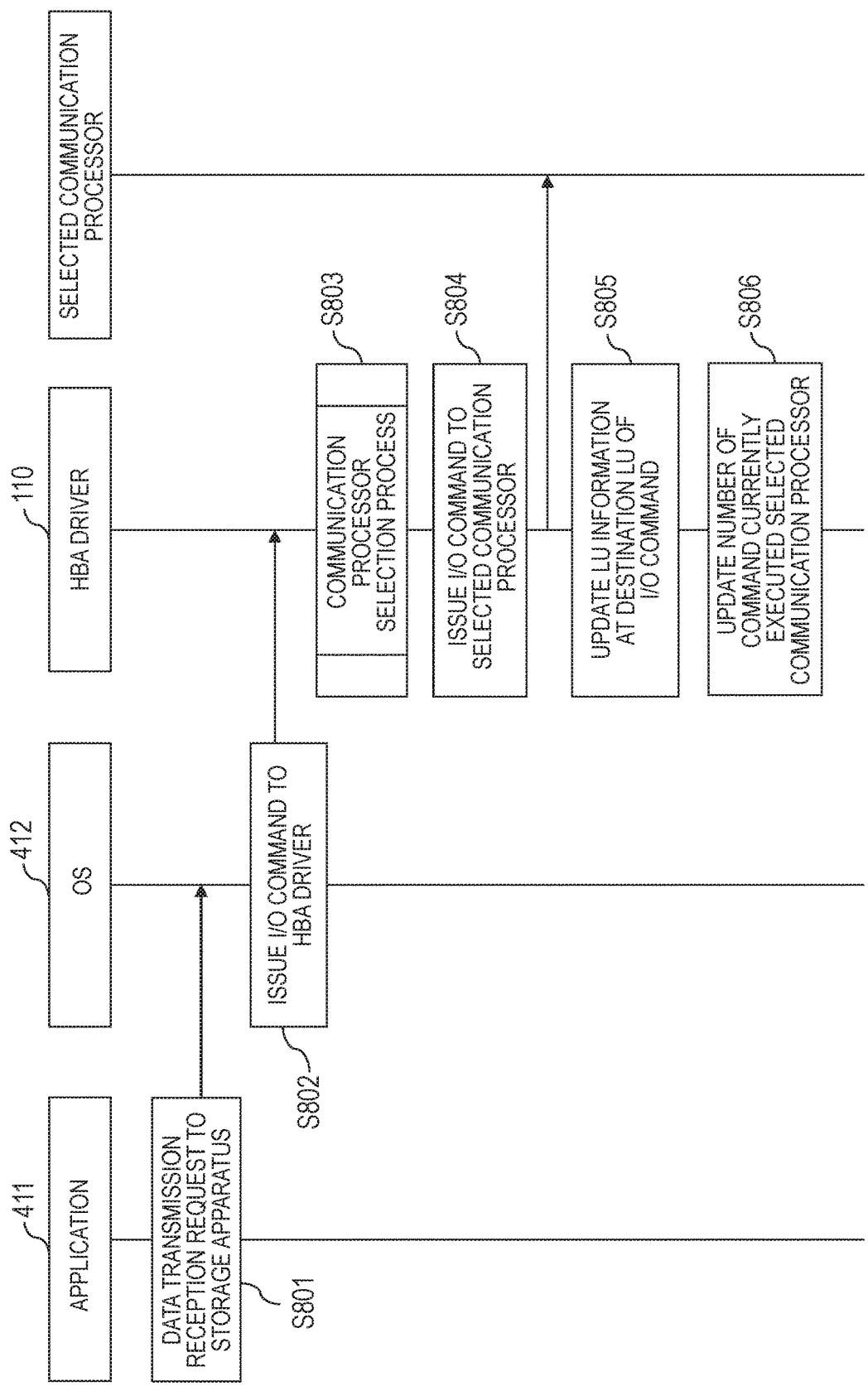
FIG. 8 is an explanatory diagram illustrating a sequence for the communication system.

FIG. 8 is an explanatory diagram illustrating a sequence for the communication system 100. It should be noted that when the description herein includes a program such as the application 411, OS 412, or the HBA driver 110 as the subject thereof, it is understood that such description equates to the description, which includes the host CPU 401 as the subject thereof, since each program herein is executed as the host CPU 401 executes a predetermined process by using the host memory 402.

Firstly, the application 411, with respect to the OS 412, executes a transmission/reception request to the storage apparatus 440 (Step S801). Upon receiving the request, the OS 412 issues an I/O command to the HBA driver 110 (Step S802). The communication processor selection program 413 of the HBA driver 110 executes a communication processor selection process configured to start the I/O command (Step S803). Note that the communication processor selected in the process of Step S803 will be referred to as a "selected communication processor." The details of the communication processor selection process (Step S803) will be described below with reference to FIG. 7.

The HBA driver 110 issues via the output unit 703 the I/O command to the selected communication processor (Step S804). After issuing the I/O command, the HBA driver 110 updates via the update unit 701 the continuity determination information (next_LBA_adr_info), the last command information (last_cmd_info), and the last core information (last_core_info) included in the connection LU information at the transfer destination logical unit of the I/O command (Step S805).

To be more specific, the continuity determination information (next LBA_adr_info) will be updated as the sum of the access address and the access block size concerning the logical unit. The last command information (last_cmd_info) will be updated as the control information which indicates as writing (W) when the I/O command issued at Step S804 includes writing or as reading (R) when the I/O command issued at Step S804 includes reading. The last core information (last_core_info) will be updated as the number for the selected communication processor which was selected during the communication processor selection process (Step S803).

Then, the HBA driver 110 updates the number of the I/O commands that are currently being executed at the selected communication processor (Step S806). To be more specific, the number of I/O command issued in Step S804 (i.e., 1 command) is added to the number of commands currently being executed (exec_cmd_num) which indicates the number of the I/O commands that are currently being executed at the selected communication processor. Note that when an I/O command completion notice is received from the selected communication processor, the number of commands currently being executed (exec_cmd_num) is subtracted.

Figure 9:
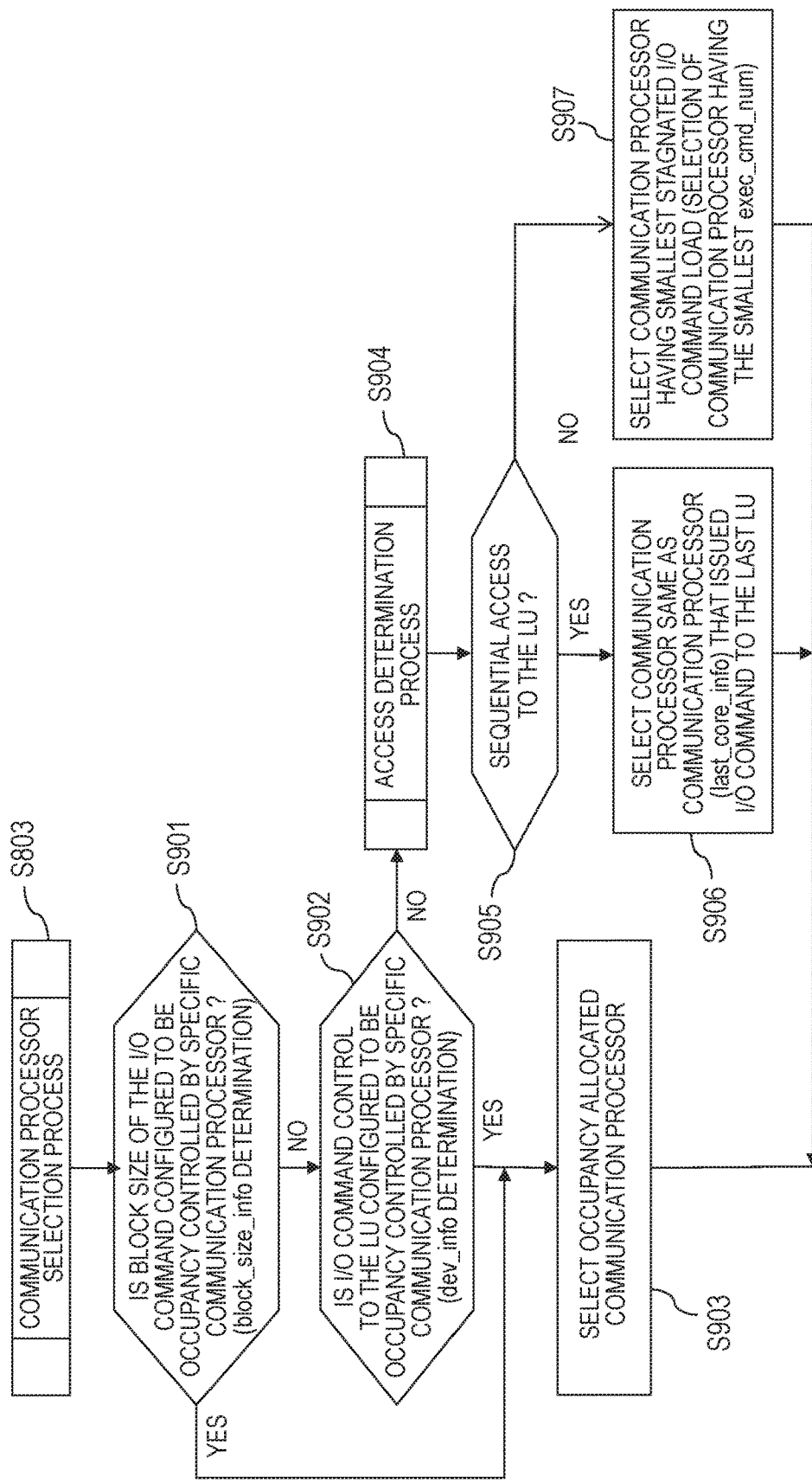
FIG. 9 is a flowchart illustrating a detailed example of the procedure of the communication processor selection process (Step S803) illustrated in FIG. 8.

FIG. 9 is a flowchart illustrating a detailed example of the procedure of the communication processor selection process (Step S803) illustrated in FIG. 8. Firstly, the HBA driver 110 has the determination unit 704 determine whether or not the block size of the I/O command (hereinafter, start command) which was issued from the OS 412 in Step S802 is configured to be occupancy controlled by a specific communication processor (Step S901). To be more specific, the HBA driver 110 may refer to the block size information (block_size_info) illustrated in FIG. 4 so as to make the determination, for example.

That is, when the occupancy control processor number corresponding to the block size includes "NOT YET SET," No will be selected at Step S901; and when the occupancy control processor number includes a number, Yes will be selected at Step S901. When Yes is selected at Step S901, the process proceeds to Step S903, where HBA driver 110 has the selection unit 702 select the communication processor for the occupancy control processor number (Step S903).

When No is selected at Step S901, the HBA driver 110 has the determination unit 704 determine whether or not the transfer destination logical unit for the start command is configured to be occupancy controlled by the specific communication processor (Step S902). To be more specific, the HBA driver 110 may refer to the occupancy allocation information (dev info) to make the determination, for example. That is, when the occupancy allocation information (dev_info) of the transfer destination logical unit includes "NOT YET SET" for the occupancy control processor number, No will be selected at Step S902; and when the occupancy control processor number includes a number, Yes will be selected at Step S902. When Yes is selected at Step S902, the process proceeds to Step S903, where HBA driver 110 has the selection unit 702 select the communication processor for the occupancy control processor number (Step S903).

The LU connected with the HBA 102 includes the disk apparatus 103 and the tape apparatus 203. The HBA driver 110 exclusively allocates the I/O command control with respect to the LU of the tape apparatus 203 to the specified communication processor. This allows the HBA driver 110 to prevent performance deterioration which would occur when the tape apparatus 203 and the disk apparatus 103 are connected with the single HBA driver 102.

When No is selected at Step S902, the HBA driver 110 has the determination unit 704 execute an access determination process (Step S904). While the details of the access determination process (Step S904) will be described below with reference to FIG. 8, during the access determination process (Step S904), a determination will be made as to whether or not the access to the transfer destination logical unit is sequential.

When the access to the transfer destination logical unit is sequential (Step S905: Yes), the process proceeds to Step S906; and when the access to the transfer destination logical unit is not sequential (Step S905: No), the process proceeds to Step S907.

When the access is sequential (Step S905: Yes), the HBA driver 110 has the selection unit 702 refer to the last core information (last_core_info), specify the communication processor that last issued an I/O command to the transfer destination logical unit, and select the communication processor (Step S906).

On the other hand, when the access is not sequential (Step S905: No), the HBA driver 110 has the selection unit 702 select the communication process having the smallest load of the stagnated I/O commands out of the communication processors (Step S907). For example, the selection unit 702 selects the communication processor having the smallest number of commands currently being executed (exec_cmd_num).

Figure 10:
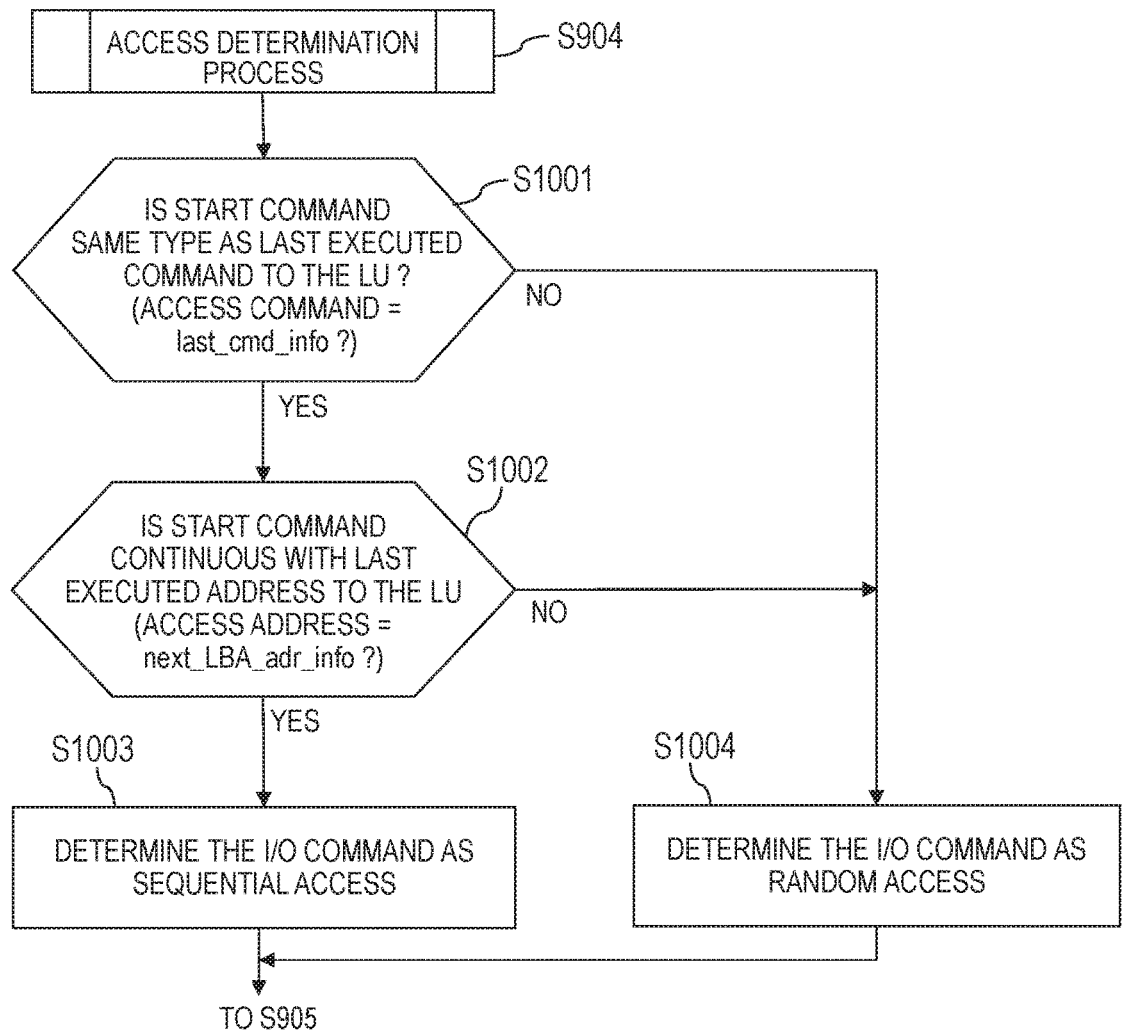
FIG. 10 is a flowchart illustrating a detailed example of the procedure of the access determination process (Step S904) illustrated in FIG. 9.

FIG. 10 is a flowchart illustrating a detailed example of the procedure of the access determination process (Step S904) illustrated in FIG. 9. Firstly, the HBA driver 110 has the determination unit 704 determine whether or not the start command is the same type as the type of access last executed with respect to the transfer destination logical unit (Step S1001). To be more specific, the HBA driver 110 determines whether or not the access type of the start command matches the access type specified by the last command information (last_cmd_info). When the types do not match (Step S1001: No), the HBA driver 110 determines that the start command includes a random access (Step S1004), which makes the process to proceed to Step S1004.

On the other hand, when the types match (Step S1001: Yes), since the access type is a sequential access, the HBA driver 110 has the determination unit 704 determine whether or not the start command is continuous with the address last executed at the transfer destination logical unit (Step S1002). To be more specific, the HBA driver 110 determines whether the continuity determination information (next_LBA_adr_info) matches the address of the start command by referring to the continuity determination information (next_LBA_adr_info) which is calculated from the address and the block size of the I/O command last executed to the transfer destination logical unit.

When the types match (Step S1002: Yes), the HBA driver 110 has the determination unit 704 determine that the start command includes the sequential access (Step S1003); and when the types do not match (Step S1002: No), the HBA driver 110 has the determination unit 704 determine that the start command includes the random access (Step S1004). After Step S1003 and Step S1004, the process proceeds to Step S905 and ends the access determination process (Step S904).

Note that although Step S1002 explains that the continuity determination information (next_LBA_adr_info) matches the address of the start command, a sequential access determination algorithm at the storage apparatus 440 may operate when the access addresses are not continuous.

For example, when within the scope of a few to several hundred bytes from the continuity determination information (next_LBA_adr_info), the storage apparatus 440 may operate assuming it is a sequential access. Accordingly, the address determination method by the HBA driver 110 may determine it to be a sequential access as long as the deviation of the address is within said scope. Also, this scope of the deviation of the address may be parameterized so as to allow a method to be adjustable in accordance with the sequential algorithm of the storage apparatus 440 which connects the HBA 102.

According to the present embodiment, the HBA driver 110 which controls the HBA 102 determines I/O characteristics by the I/O load per communication processor and the type of access to the storage apparatus 440, the access address, and the block size, so as to select the communication processor to start an I/O command. This allows the HBA 102 to improve the transaction performance. Also, the HBA 102 has a specified communication processor to occupancy control the I/O command process to the LU which connects the specified communication processor. This method achieves data transmission without bottleneck performance.

Note that the present invention is not limited to the above described embodiment, and may include various modifications. For example, the above described embodiment was described into details in order to facilitate the understanding of the present invention, but the present invention is not limited to the configuration in which all the elements described above are arranged. Also note that the procedural orders described with reference to FIG. 6 through FIG. 8 may be changed as needed.

Second Embodiment

Next, a second embodiment of this invention is described.
<Configuration of Computer System Using LPARs>

Figure 11:
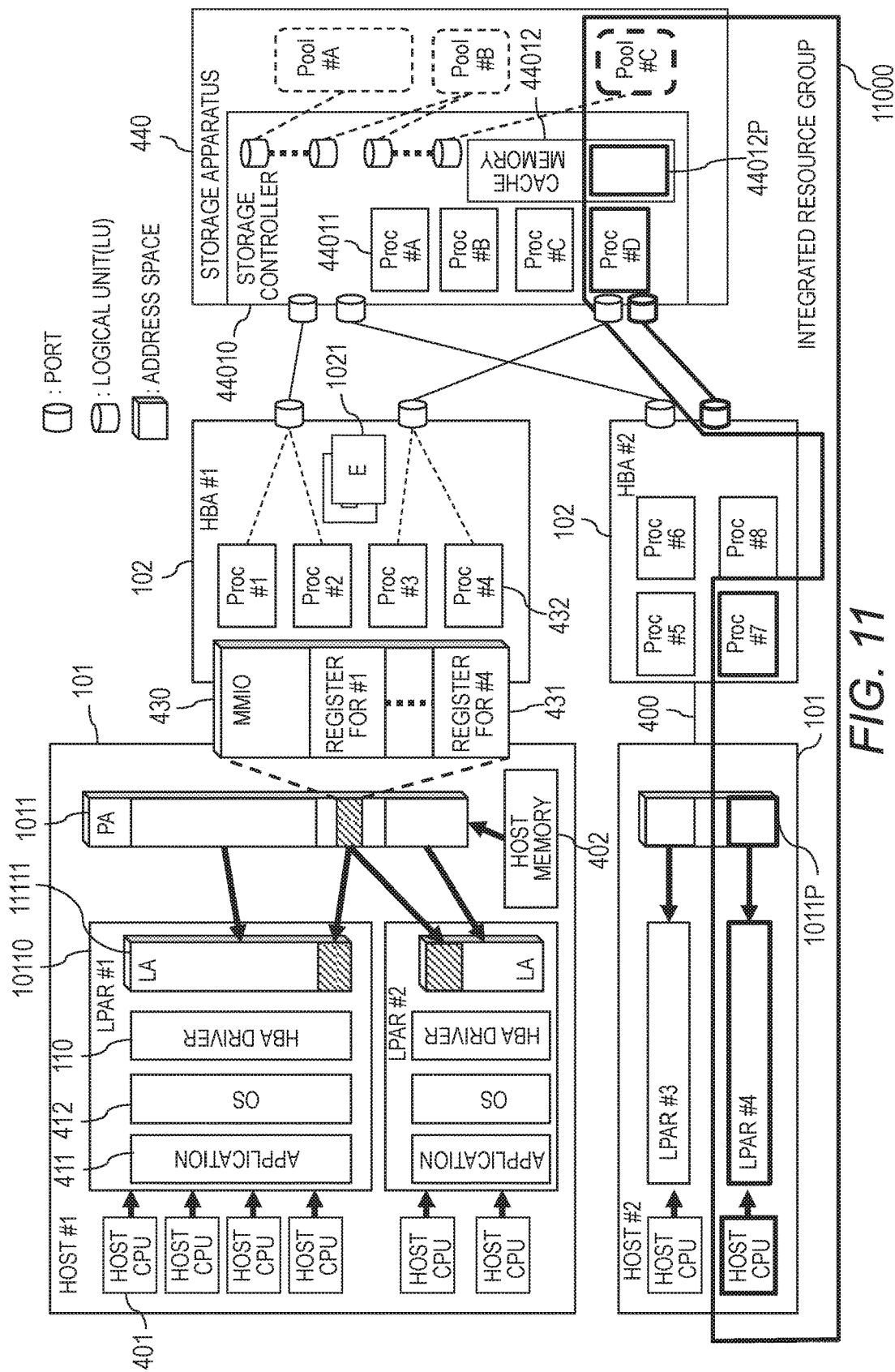
FIG. 11 is a diagram for illustrating a configuration of a computer system according to the second embodiment.

FIG. 11 is a diagram for illustrating a configuration of a computer system according to the second embodiment. This embodiment is different from the first embodiment in that LPARs are created in the hosts 101, and that the internal components of the storage apparatus 440 are disclosed. Other points, in particular, the internal configuration of the HBAs 102, have already been described in the first embodiment, and hence a description thereof is omitted here. The entities present in the first embodiment are not illustrated in FIG. 11, but that omission is in no way intended to actively exclude those entities. Each "Proc" 432 included in the HBAs 102 of FIG. 11 represents a communication processor 432, and each "Proc" 44011 included in the storage apparatus 440 represents a storage processor. A data transfer engine 1021 is included in the HBAs 102 (the data transfer engine 1021 is abbreviated as the letter "E" in FIG. 11).

In the example of FIG. 11, in order to simplify implementation, communication processors 432 capable of being used by each port of the HBAs 102 are illustrated as having been determined, but this configuration is not essential. Examples of the data transfer engine 1021 may include a direct memory access (DMA) engine and an engine configured to control frame transmission and reception by the HBAs 102. However, any entity may be employed, as long as the entity is configured to transfer data to and from the storage apparatus 440 and the host memory 402.

<<LPARs>>

An LPAR 10110 is a logical host generated in the hosts 101. A host CPU 401 and a partial area of the host memory 402 or a determined memory amount are allocated to each LPAR 10110. Each LPAR 10110 is configured to execute the application 411, the OS 412, and the HBA driver 110 by using those allocated host resources. The HBA driver 110 and the OS 412 may be separate software modules, or may be the same software module. Similarly, the HBA driver 110 and the application 411 do not need to be separate software modules.

The LPARs 10110 are typically generated in the following manner.

Hypervisor method: A hypervisor program is executed by the host CPU 401.

Container method: In place of the OS 412 and the HBA driver 110 being executed for each LPAR 10110, the OSes 412 and the HBA drivers 110 shared among the LPARs 10110 are executed. Each LPAR 10110 is capable of regarding an area or amount of the host CPU 401 and the host memory 402 to be used for the application 411 to be internally executed as a separate entity.

The method of generating the LPARs 10110 may be another method. The following description is based on the assumption that the hypervisor method is used.

<Allocation of Communication Processors 432 to LPARs 10110>

The LPARs 10110 are capable of dedicatedly using the host resources, and hence performance conflict among the LPARs 10110 during normal calculation usage can be substantially reduced (i.e., is almost non-existent during normal calculation usage). However, applications in recent years can produce a high I/O load, and because the devices and apparatus relating to I/O are shared, performance conflict occurs. In particular, in recent years, due to increases in the number of cores in CPUs and increases in the capacity of the host memory 402, there has been an increase in the number of I/O commands to be processed by one HBA 102, and hence consideration needs to be given to the I/O command processing limit of the HBA 102 itself. Therefore, in the second embodiment, the communication processors 432 in the HBAs 102 are allocated as follows.

- A management computer is configured to dedicatedly allocate a specific communication processor 432 to the LPARs 10110 requiring an I/O performance (in particular, I/O operations per second (IOPS)). As a result of that allocation, that specific communication processor 432 cannot be used by the other LPARs 10110, which allows performance conflict with the other LPARs 10110 to be resolved. Even more efficient I/O processing can be achieved by executing a plurality of applications 411 having different access patterns in separate LPARs 10110. Examples of such processing include online transaction processing (OLTP) and data warehousing (DWH).
- The management computer is configured to allocate, when there is an LPAR 10110 that does not require an I/O performance, a shared communication processor 432 determined in advance to the LPAR 10110 (shared allocation). This is a countermeasure taken in order to avoid a situation in which such an LPAR 10110 does not have any communication processors 432 to use for transmitting I/O commands because all of the communication processors 432 are dedicated.

<Allocation of Storage Resources to LPARs 10110>

I/O command-related performance conflict may occur even in the storage apparatus 440. From an IOPS perspective, the storage resources described below can become a bottleneck.

- Storage processor 44011: The storage processor 44011 is configured to receive and interpret I/O commands from the HBA 102, and to transfer data in cooperation with the data transfer engine (not shown) in the storage apparatus 440.
- Pool: The pool includes a plurality of storage devices. Typically, the pool is configured to transfer the target data of an I/O command while operating the plurality of storage devices in parallel. As a result, the number of storage devices included in the pool influences the processable IOPS limit. Further, the storage devices include an HDD that involves head movement and a non-volatile memory (for example, flash memory) that does not involve head movement, and hence the type of the storage devices also influences the IOPS limit of the pool.

From a transfer bandwidth (hereinafter simply referred to as "bandwidth") perspective, the storage resources described below can become a bottleneck.

- Port: The port determines a maximum bandwidth based on a coupling standard.
- Pool: In addition to the transfer capability limit of the storage devices themselves, the bandwidth limit of the coupling between each storage device and a storage controller 44010 influences the bandwidth, and hence typically, a higher number of storage devices is better. The type of the storage devices also influences the bandwidth.

From a response time perspective, in addition to the IOPS perspective and the bandwidth perspective, a hit ratio of a cache memory 44012 also influences the bandwidth. For the same access characteristics of the application 411, the hit ratio tends to improve when the cache memory 44012 is larger. Therefore, when the cache memory amount that can be used by the LPAR 10110 executing an important application decreases due to an increase in the amount of the cache memory 44012 used by other LPARs 10110, the cache hit ratio decreases, which may cause the response time to worsen.

<Integrated Resource Group>

An integrated resource group 11000 is a logical entity including host resources and storage resources dedicatedly allocated to the LPAR 10110. In the example of FIG. 11, the integrated resource group of an LPAR #4 includes one host CPU 401, a part (area 1011P) of the total area provided by the host memory 402, a communication processor #7 of an HBA #2 (102), a storage processor #D of the storage apparatus 440, a partial area 44012P of the cache memory 44012, and a pool #C.

The storage resources of the integrated resource group 11000 may be shared by a plurality of LPARs 10110. For example, the storage resources may be shared as follows.

- When the integrated resource group is shared by a plurality of LPARs 10110 of the same host 101, the storage resources and the communication processors 432 may be shared. This is an example of a selection option that can be implemented comparatively easily when the number of communication processors 432 in the HBA 102 is equal to or less than the number of LPARs 10110.
- When the integrated resource group is shared by the LPARs 10110 of different hosts 101, the storage resources are shared. This example is preferred when high-availability (HA) clustering or performance clustering is performed among those LPARs 10110. This is because the load to be processed needs to be handled by the whole cluster, and not the individual LPARs 10110, and therefore the storage resources of the storage apparatus 440, which is the shared access destination, need to be flexibly adjusted in the cluster rather than allocating the storage resources to the individual LPARs 10110, to thereby enable the overall cluster to exhibit better performance.

The meaning of "dedicatedly allocate to (one or more) LPARs 10110" is that the allocated resource is not used by the LPARs 10110 to which that resource is not allocated.

Examples of other storage resources that may be used as resources to be allocated dedicatedly include the following. However, the following storage resources may also be included in an integrated resource group as resources.

- The data transfer engine of the HBAs 102.
- The set IOPS and set bandwidth when there is IOPS and bandwidth control throttling due to the storage processor 44011. A throttling setting may be set not only for the storage processor 44011, but also for the ports, the LUs, the pool, and the cache memory, as well as internal LUs, parity groups, and a network interface controller (NIC) (not shown) of the hosts 101. The throttling setting may also be set for other host resources and storage resources.

The bandwidth of an apparatus or medium for coupling the HBAs 102 and the storage controller 44010 to each other. The ports of the HBAs 102 and the ports of the storage apparatus 440 are included in this.

The LUs, the internal LUs, the parity groups, and the storage devices included in the parity groups. An internal LU is a relation that becomes an LU when allocated to each of the one or more ports of the storage apparatus 440 together with a logical unit number (LUN).

<Relation Among MMIO Space of HBAs 102, Physical Address Space of Hosts 101, and Physical Address Space of LPARs>

Next, the relation between the physical address space of the hosts 101 and an LPAR physical address space is described. Similarly to the first embodiment, in the second embodiment as well, the register of the HBAs 102 is mapped to a physical address space 1011 (abbreviated as "PA 1011" in FIG. 11) of the hosts 101 as a part of the MMIO space. A physical address space for each LPAR 10110 (to avoid confusion, those physical address spaces are referred to below as an "LPAR physical address space") is generated by processing by a hypervisor. In FIG. 11, the LPAR physical address space is abbreviated as "LA 11111".

<<First Method: MMIO Mapping Method>>

In a MMIO mapping method, an MMIO space 430 of the HBAs 102 is mapped to each LPAR physical address space 11111 of each LPAR 10110 (hatched area in LA 11111 of FIG. 11). The HBA driver 110 in each LPAR 10110 is capable of transmitting an I/O command to the HBA 102 by accessing the MMIO space mapped to the LPAR physical address space.

<<Second Method: Virtual Interface Device Method>>

In a virtual interface device method, a virtual interface device is generated by the hypervisor, and the generated virtual interface device is provided to the OS 412 of the LPAR 10110. The hypervisor is configured to detect the issuance of an I/O command to the virtual interface device by the OS 412, and to issue an I/O command to the HBA driver 110 executed on the hypervisor.

<From Issuance of I/O Command to Data Storage in LPARs 10110>

Next, an operation from issuance of an I/O Command to data storage in the LPARs 10110 is described. First, the operation for the MMIO method is described.

<<First Method: MMIO Mapping Method>>

The I/O command processing when the communication processor 432 has been dedicatedly allocated to the LPAR 10110 is now described by using read processing as an example.

(Step S11-01) The application 411 issues to the OS 412 a file read request with the address of the read data storage destination designated by a virtual address space.

(Step S11-02) The OS 412 receives the file read request, generates a read command based on the file read request, and issues the read data storage destination address and the read command to the HBA driver 110.

(Step S11-03) The HBA driver 110 stores the received read command and read data storage destination address in the host memory 402.

(Step S11-04) The HBA driver 110 selects, from among the usable communication processors 432, the communication processor 432 to be the transmission destination for the received read command. The usable communication processors 432 are grasped in advance before the file read request. For example, when the HBA driver 110 is started, that HBA driver 110 may receive and hold an identifier list of the usable communication processors 432 from the hypervisor. However, the usable communication processors 432 may also be grasped by using another method.

(Step S11-05) The HBA driver 110 notifies, by accessing the register of the MMIO space corresponding to the selected communication processor 432, the selected communication processor 432 of the presence of the read command to be transmitted.

(Step S11-06) The selected communication processor 432 detects the access of the register, and reads the read command and read data storage destination address stored in the host memory 402 in Step S11-03.

(Step S11-07) The selected communication processor 432 transmits the read command to a port of the storage apparatus 440 via a port of the HBA 102.

(Step S11-08) The selected communication processor 432 transmits to the data transfer engine 1021 an instruction to write the data received from the storage apparatus 440 in the read data storage destination address of the host memory 402.

The processing described above is I/O command processing using read processing as an example. In the case of write processing, there are, for example, the following differences in the steps described above.

"File write request" is used in place of the "file read request".

As the I/O command, a "write command" is used in place of the "read command".

The "address of the write data storage destination" is used in place of the "address of the read data storage destination".

In Step S11-08, the processing is changed to "the selected communication processor 432 waits for a response from the storage apparatus 440 that transfer preparation has been completed, and then transmits to the data transfer engine 1021 an instruction to transmit the write data to the storage apparatus 440 from the write data storage destination address".

The read or write data storage destination address received by the HBA 102 indicates an address in an LPAR physical address space, and hence that address may be converted into an address in a physical address space for the data transfer engine. That conversion processing may be performed by the hypervisor, a hardware function of the HBA 102 and the host CPU 401, or a hardware function provided by a chipset on the host 101. The request issued by the application may be a block access request other than of a file.

<<Second Method: Virtual Interface Device Method>>

Similarly to the first method, the I/O command processing when the communication processor 432 has been dedicatedly allocated to the LPAR 10110 is now described by using read processing as an example.

(Step S12-01) The application 411 issues to the OS 412 a file read request with the address of the read data storage destination designated by the virtual address space (as in the first method).

(Step S12-02) The OS 412 receives the file read request, generates a read command based on the file read request, and issues the read data storage destination address and the read command to the virtual interface device.

(Step S12-02B) The hypervisor detects the issuance of the read command to the virtual interface device by the OS 412, and issues a read data storage destination address and a read command to the HBA driver 110.

(Step S12-03) The HBA driver 110 stores the received read command and read data storage destination address in the host memory 402.

(Step S12-04) The HBA driver 110 selects, from among the usable communication processors 432, the communication processor 432 to be the transmission destination for the received read command (selection method is described below).

(Step S12-05 to Step S12-08) Step S12-05 to Step S12-08 are the same as Step S11-05 to Step S11-08.

When an allocation correspondence relation between the LUs and the LPARs 10110 is 1:N, for example, the following method may be employed as the selection method in Step S12-04.

(Step S12-04A) The HBA driver 110 receives and grasps a correspondence list between the LUs and the communication processors 432 from the management computer. The correspondence list is generated by the management computer based on a "list of the LUs accessed by each LPAR 10110" and a "list of the communication processors 432 allocated to each LPAR 10110" stored in the management computer.

(Step S12-04B) The HBA driver 110 refers to the correspondence list, and selects the communication processor 432 corresponding to the LU included in the received read command.

The second method has been described above. The other steps in this processing are the same as in the first method, and hence a description thereof is omitted here.

<<Advantages of Both Methods>>

Based on the above-mentioned operations, the two methods described above respectively have the following advantages.

MMIO mapping method: Virtual interface device processing by the hypervisor is not necessary, and hence the I/O processing overhead is small.

Virtual interface device method: When a more general virtual interface device, for example, a serial advanced technology attachment (SATA) device, can be provided, communication processor allocation can be applied to a greater variety of OSes 412, and communication processor allocation can be applied without enhancing (or only enhancing by a small amount) the program operating on the LPAR 10110, for example, the OS 412.

<Other Implementation Methods>

Implementation methods other than the above-mentioned I/O command processing method may also be employed. Examples thereof include the following.

The HBA 102 provides a virtual HBA of the above-mentioned first method. The hypervisor only maps the MMIO space of that virtual HBA to a specific LPAR physical address space. In this method, selection processing does not need to be performed by the hypervisor, but enhancement by the HBA 102 is necessary.

<Coexistence with LPAR 10110 not Requiring I/O Performance>

As described above, depending on the LPAR 10110, the frequency of I/O performed by the application 411 may not be high, and hence dedicated allocation of the communication processors 432 and the storage resources may be an excessive allocation. In order to handle such LPARs 10110 (for convenience, referred to as "I/O low-priority LPARs"), the management computer may be configured to further set in advance shared storage resources in addition to the shared communication processors 432 described above, and to allocate in a shared manner those shared communication processors 432 and shared storage resources to the I/O low-priority LPARs.

Based on such a setting, the I/O low-priority LPARs avoid performance conflict with the other LPARs 10110 that are not I/O low-priority LPARs. Setting the shared setting in advance also prevents the shared resources from becoming depleted due to dedicated use, which can prevent occurrence of a situation in which a I/O low-priority LPAR cannot transmit an I/O command.

<Management Computer>

The computer system may also include a management computer (not shown). In this case, the management computer includes a user interface configured to receive user input, a CPU configured to execute a management program, and storage resources configured to store configuration information on components of the computer system, which are represented by, for example, the host 101 and the storage apparatus 440. The management computer may be configured to perform, for example, the following processing.

Allocation of the communication processors to the LPARs 10110.

Allocation of the communication processors 432 and the storage resources based on an I/O performance requirement.

Allocation of the host resources and the storage resources based on a template.

Each of those processes is now described.

<<Allocation of Communication Processors to LPARs 10110>>

As described above, dedicated allocation of the communication processors 432 to each of the LPARs 10110 is inefficient and impractical. Therefore, the management computer may be configured to perform the following processing by executing a management program.

The management computer receives, from the user via the user interface, user input including an identifier of the LPAR 10110 and which (and how many) communication processor(s) 432 are to be allocated. Based on the received user input, the management computer transmits to the host 101 (more correctly, to the hypervisor or HBA driver 110 of the host 101, or the HBA 102) an instruction to allocate the communication processors to the LPAR 10110 designated by the user.

The management computer acquires information from the host 101 (more correctly, from the hypervisor or HBA driver 110 of the host 101, or the HBA 102), and displays on the user interface an allocation relation between the LPAR 10110 and the communication processors 432. The display may also contain information on whether or not that relation is a dedicated allocation or is a shared allocation.

Examples of the transmission method of those instructions include the following.

MMIO mapping method: Dedicated allocation of the communication processors 432 to the LPAR 10110 is implemented by transmitting the identifiers of different communication processors 432 to each HBA driver 110 being executed by the LPAR 10110.

Virtual interface device method: A list corresponding to predetermined communication processors 432 is created and transmitted to only the LUs to be accessed by the LPAR 10110 to which the predetermined communication processors 432 are to be dedicated.

<<Management of Shared Communication Processors and Shared Storage Resources>>

The management computer stores, based on user input, predetermined communication processors 432 and predetermined storage resources for shared usage. Then, when performing dedicated allocation to the following LPARs 10110, the management computer performs allocation such that the predetermined communication processors 432 and the predetermined storage resources managed for shared usage are excluded from dedicated use.

<<Allocation of Communication Processors 432 and Storage Resources Based on I/O Performance Requirement>>

When the management computer has a clear I/O performance requirement to the LPARs 10110 due to, for example, a service level objective (SLO) of the application 411, the management computer calculates an appropriate number of communication processors 432 based on that I/O performance requirement (typically received via the user interface) and an appropriate number or amount of storage resources, and to transmit an allocation request to the hosts 101 and the storage apparatus 440.

Figure 12:
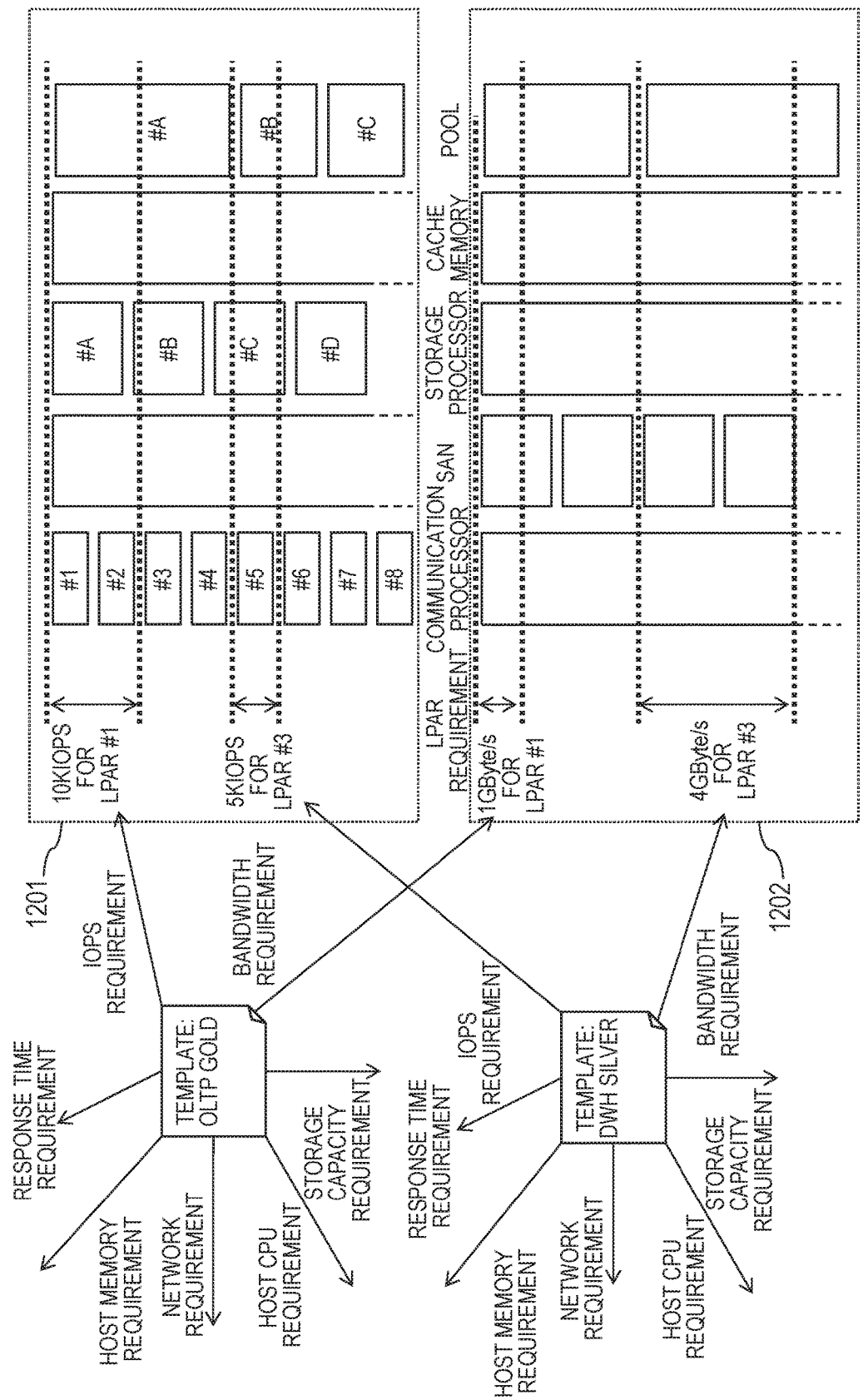
FIG. 12 is a diagram for illustrating resource allocation according to the second embodiment.

FIG. 12 is a diagram for illustrating resource allocation according to the second embodiment. In FIG. 12, an area 1201 is an illustration of a relation between an IOPS requirement and a maximum performance of each communication processor 432 and storage resource. In FIG. 12, an area 1202 is an illustration of a relation between a bandwidth requirement and a maximum performance of each communication processor 432 and storage resource.

The heights of the respective areas each represent a magnitude of the requirement or a magnitude of a maximum performance of each communication processor 432 and storage resource. A minimum value of the maximum performance of the communication processors 432 and storage resources, which influence the IOPS requirement and the bandwidth requirement, is the maximum performance of the LPARs 10110. However, regarding the pool, there is an effect from the cache memory 44012 before the pool, and hence the effect of the cache memory 44012 needs to be taken into consideration.

In the area 1201, there is illustrated an example in which, based on the IOPS requirement of 10K IOPS for the LPAR #1, it has been calculated that two communication processors 432, one storage processor 44011, and dedicated allocation of a pool #A are preferred. Thus, in order to satisfy the IOPS requirement, in principle, the maximum performance of the communication processors 432 influencing the IOPS, the maximum performance of the storage processor 44011, and the maximum performance of the pool all need to be equal to or more than the IOPS requirement.

However, such addition allocation is not necessary when, like the example of the storage processor 44011, the maximum performance is slightly insufficient, and the allocation becomes excessive if a storage processor 44011 is newly added. In this manner, the management computer is configured to calculate the number of communication processors 432 and the number or amount of storage resources for satisfying the IOPS requirement designated by the user input. The same is also the case for the area 1202.

When a certain requirement is less than a predetermined value, the management computer may regard the LPAR 10110 corresponding to that requirement as an I/O low-priority LPAR. Whether or not the LPAR 10110 is an I/O low-priority LPAR may be judged for each requirement. For example, when the LPAR 10110 is determined as being an I/O low-priority LPAR for only the IOPS requirement, the management computer may allocate in a shared manner the shared usage communication processors 432 to that LPAR.

<<Template-Based Allocation of Host Resources and Storage Resources>>

The second embodiment is now further described with reference to FIG. 12. Designating the requirements by using specific numerical values as described above is difficult unless the user is knowledgeable about I/O characteristics determined by, for example, the application 411 and usage of the application 411. Therefore, allocation templates are held in the management computer, and when the user has designated a template, the host resources and the storage resources are allocated in accordance with the contents of the designated template.

In FIG. 12, an "on-line transaction processing (OLTP) Gold" template and a "Data WareHouse (DWH) Silver" template are illustrated as examples of such allocation templates. Those templates are examples of information created in advance by a user who is knowledgeable about the I/O characteristics described above. In the example of FIG. 12, for the OLTP Gold template, the IOPS requirement is 10K IOPS, and the bandwidth requirement is 1 GByte/s. The template may include the number and amount of host resources, communication processors 432, and storage resources in place of a numerical value for the I/O performance requirement. The template may also include information indicating whether or not allocation needs to be dedicated or may be shared.

The second embodiment has been described above.

This invention has been described in detail so far with reference to the accompanying drawings, but this invention is not limited to those specific configurations described above, and includes various changes and equivalent components within the gist of the scope of claims appended.

What is claimed is:

1. A computer system, comprising:
   a host computer including a host memory and a plurality of host processors;
   a storage apparatus;
   an interface device coupled to the host computer and the storage apparatus, the interface device including a plurality of communication processors; and
   a management computer,
   wherein the host computer is configured to create a first logical partition, which is a destination of dedicated allocation of a first host memory area which is a partial area of the host memory, at least one of the plurality of host processors, and at least one of the plurality of communication processors, and
   wherein the management computer is configured to perform the following processing:
   (1) receive user input from a user interface of the management computer;
   (2) select a communication processor to be allocated to the first logical partition from the plurality of communication processors based on the user input; and
   (3) transmit to the host computer a first request for allocating the selected communication processor to the first logical partition.

2. The computer system according to claim 1,
   wherein the storage apparatus includes a plurality of storage resources for processing an input/output (I/O) command issued by the host computer, and
   wherein the management computer is configured to perform the following processing:
   (4) select a storage resource to be allocated to the first logical partition from the plurality of storage resources based on the user input;
   (5) transmit to the storage apparatus a second request for dedicated allocation of the selected storage resource to the first logical partition; and (6) transmit to the host computer a third request for allocating the selected storage resource to the first logical partition.

3. The computer system according to claim 2,
wherein the processing of (1) includes calculating a first requirement relating to a number of I/O commands per unit time based on the user input, and
wherein the selection performed in the processing of (2) includes calculating a number of communication processors necessary in order to satisfy the first requirement, and the selection performed in the processing of (4) includes calculating one of a number and an amount of storage resources necessary in order to satisfy the first requirement.

4. The computer system according to claim 2, wherein the management computer is configured to perform the following processing:
(7) manage at least a part of the plurality of storage resources as shared storage resource; and
exclude, when the selection performed in the processing of (4) is a dedicated allocation, the shared storage resource from being selected.

5. The computer system according to claim 1,
wherein one of the first logical partition and a hypervisor configured to generate the first logical partition is configured to execute a device driver of the interface device, and
wherein the host computer is configured to perform the following processing:
(A) receive the first request; and
(B) transmit to the device driver an identifier of the communication processor allocated by the first request, and
wherein the device driver is configured to perform the following processing:
(C) receive the identifier of the allocated communication processor;
(D) select, when an input/output (I/O) command from one of an application and an operating system (OS) to be executed in the first logical partition has been received, the communication processor to which the I/O command is to be transmitted based on the received identifier; and
(E) transmit the I/O command to the allocated communication processor by accessing a register of a memory-mapped I/O (MMIO) space corresponding to the communication processor selected by the processing of (D).

6. The computer system according to claim 5,
wherein when the device driver is to be executed by a logical partition (LPAR), the device driver is executed in each of a plurality of logical partitions, and
wherein the management computer is configured to set a dedicated use in each of the plurality of logical partitions by transmitting an identifier of a different communication processor to the device driver being executed in the each of the plurality of logical partitions.

7. The computer system according to claim 5,
wherein the hypervisor is configured to:
allocate a predetermined logical unit (LU) provided by the storage apparatus to the first logical partition in a dedicated manner;
provide to the first logical partition a virtual interface device capable of transmitting the I/O command to the predetermined LU; and
execute the device driver, wherein the management computer is configured to:
generate, based on an identifier of an LU allocated in a dedicated manner to the first logical partition and the identifier of the communication processor received in the processing of (C), a correspondence list indicating correspondence between the identifier of the LU allocated in a dedicated manner and the identifier of the communication processor; and
transmit the generated correspondence list to the device driver, and
wherein the device driver is configured to:
receive the I/O command received via the virtual interface device from the hypervisor; and
perform the selection performed in the processing of (D) based on an LU designated in the I/O command and the received correspondence list.

8. A computer system, comprising:
a host computer including a host memory and a plurality of host processors;
a storage apparatus; and
an interface device coupled to the host computer and the storage apparatus, the interface device including a plurality of communication processors,
wherein the host computer is configured to create a first logical partition, which is a destination of dedicated allocation of a first host memory area which is a partial area of the host memory, at least one of the plurality of host processors, and at least one of the plurality of communication processors
wherein the host computer is configured to create a second logical partition for dedicated allocation of the following (i) to (iii):
(i) a second host memory area, which is a partial area of the host memory other than the first host memory area;
(ii) at least one of the plurality of host processors other than the at least one of the plurality of host processors allocated to the first logical partition; and
(iii) at least one of the plurality of communication processors other than the at least one of the plurality of communication processors allocated to the first logical partition, and
wherein a first application to be executed in the first logical partition and a second application to be executed in the second logical partition each have a different average value of a length of transfer data on which an input/output (I/O) command is to be executed.

9. A computer system, comprising:
a host computer including a host memory and a plurality of host processors;
a storage apparatus; and
an interface device coupled to the host computer and the storage apparatus, the interface device including a plurality of communication processors,
wherein the host computer is configured to create a first logical partition, which is a destination of dedicated allocation of a first host memory area which is a partial area of the host memory, at least one of the plurality of host processors, and at least one of the plurality of communication processors,
wherein the plurality of communication processors are to be allocated to the first logical partition,
wherein the first logical partition is configured to execute a device driver, an operating system (OS), and an application, and wherein the device driver is configured to select, when an input/output (I/O) command has been received from one of the application and the OS, a communication processor to be a transmission destination from the plurality of communication processors based at least on a length of transfer data on which the I/O command is to be executed.

* * * * *